US010984542B2

(12) United States Patent
Chen et al.

(10) Patent No.: US 10,984,542 B2
(45) Date of Patent: Apr. 20, 2021

(54) METHOD AND DEVICE FOR DETERMINING GEOMETRIC TRANSFORMATION RELATION FOR IMAGES

(71) Applicant: Beijing Bytedance Network Technology Co., Ltd., Beijing (CN)

(72) Inventors: Yangyu Chen, Beijing (CN); Yi He, Beijing (CN); Lei Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 16/981,240

(22) PCT Filed: Nov. 20, 2018

(86) PCT No.: PCT/CN2018/116344
§ 371 (c)(1),
(2) Date: Sep. 15, 2020

(87) PCT Pub. No.: WO2020/052068
PCT Pub. Date: Mar. 19, 2020

(65) Prior Publication Data
US 2021/0027478 A1 Jan. 28, 2021

(30) Foreign Application Priority Data
Sep. 12, 2018 (CN) .......................... 201811060837.X (51) Int. Cl.
*G06T 7/37* (2017.01)
*G06T 7/33* (2017.01)

(52) U.S. Cl.
CPC . *G06T 7/37* (2017.01); *G06T 7/33* (2017.01)

(58) Field of Classification Search
CPC .... G06T 7/37; G06T 7/33; G06T 2207/10004
See application file for complete search history.

(56) References Cited

U.S. PATENT DOCUMENTS

| 4,989,142 A | 1/1991 | Crawford |
| 9,953,425 B2 * | 4/2018 | Lin .......................... G06T 7/33 |

(Continued)

FOREIGN PATENT DOCUMENTS

| CN | 101238351 A | 8/2008 |
| CN | 101500172 A | 8/2009 |

(Continued)

OTHER PUBLICATIONS

Multiple view relations using the teaching and learning-based optimization algorithm. (2020). Computers, 9(4), 101. doi:http://dx.doi.org/10.3390/computers9040101.*

(Continued)

*Primary Examiner* — Charles T Shedrick
(74) *Attorney, Agent, or Firm* — BakerHostetler (57) ABSTRACT

A method for determining geometric transformation relation for images is provided. The method includes: obtaining a first image and a second image collection; obtaining coordinates of three non-collinear pixels in the first image to forma coordinate collection; generating a target matrix according to the coordinate collection, and for the at least two second images in the second image collection, obtaining coordinates of pixels in the at least two second images corresponding to coordinate-indicative pixels in the coordinate collection to form a corresponding coordinate collection; according to the corresponding coordinate collection, generating a target column vector matching a column number of the target matrix; pre-multiplying the target matrix by the target column vector to obtain a transformation column vector; determining the geometric transformation relation of the first images and the at least two second images according to the transformation column vector.

20 Claims, 5 Drawing Sheets

(56) References Cited

U.S. PATENT DOCUMENTS

| | | | |
|---|---|---|---|
| 2011/0243401 A1* | 10/2011 | Zabair | G06T 7/0012 |
| | | | 382/128 |
| 2014/0129719 A1* | 5/2014 | Weber | H04L 47/823 |
| | | | 709/226 |
| 2015/0254555 A1* | 9/2015 | Williams, Jr. | G06N 3/0454 |
| | | | 706/14 |
| 2015/0302268 A1 | 10/2015 | Collet et al. | |
| 2016/0275686 A1* | 9/2016 | Zach | G06K 9/6201 |
| 2018/0060738 A1* | 3/2018 | Achin | G06Q 10/04 |
| 2018/0129916 A1 | 5/2018 | Takahashi | |

FOREIGN PATENT DOCUMENTS

| | | |
|---|---|---|
| CN | 102194215 A | 9/2011 |
| CN | 103679735 A | 3/2014 |
| CN | 104504723 A | 4/2015 |
| CN | 104766084 A | 7/2015 |
| CN | 104981842 A | 10/2015 |
| CN | 105488754 A | 4/2016 |
| CN | 105551022 A | 5/2016 |
| CN | 105931237 A | 9/2016 |
| CN | 106296714 A | 1/2017 |
| CN | 106500669 A | 3/2017 |
| CN | 106910210 A | 6/2017 |
| CN | 107958236 A | 4/2018 |
| CN | 108305281 A | 7/2018 |
| JP | H03-241973 A | 10/1991 |

OTHER PUBLICATIONS

International Patent Application No. PCT/CN2018/116344; Int'l Search Report; dated Jun. 3, 2019; 2 pages.

\* cited by examiner

METHOD AND DEVICE FOR DETERMINING GEOMETRIC TRANSFORMATION RELATION FOR IMAGES

CROSS-REFERENCE TO RELATED APPLICATION

The disclosure is the national phase application of International Patent Application No. PCT/CN2018/116344, filed on Nov. 20, 2018, which claims the priority benefit of CN applications Ser. No. 201811060837.X, filed on Sep. 12, 2018, titled "METHOD AND DEVICE FOR DETERMINING GEOMETRIC TRANSFORMATION RELATION BETWEEN IMAGES". The entirety of the above-mentioned patent application will be hereby incorporated by reference herein and made a part of this specification.

TECHNICAL FIELD

The disclosure relates to a computer technical field, and more particularly to a method and a device for determining geometric transformation relation for images.

DESCRIPTION OF RELATED ART

When geometric transformation relation for two images is solved, generally, three non-collinear pixel points are firstly determined in one image, three matched pixel points are determined in the other image, and then a transformation matrix between the two images is solved.

In a scene of one-to-many image processing, that is, when the geometric transformation relation between a target image and a plurality of images needs to be solved, the transformation matrix between the target image and each image is solved according to the solving process of the geometric transformation relation between the above two images.

SUMMARY

Embodiments of the disclosure provide a method and a device for determining geometric transformation relation for images.

In a first aspect, an embodiment of the disclosure provides a method for determining geometric transformation relation for images. The method includes obtaining a first image and a second image collection; obtaining coordinates of three non-collinear pixels in the first image to form a coordinate collection; according to the coordinate collection, generating a target matrix; and for the at least two second images in the second image collection, obtaining coordinates of pixels in the at least two second images corresponding to coordinate-indicative pixels in the coordinate collection to form a corresponding coordinate collection; according to the corresponding coordinate collection, generating a target column vector matching a column number of the target matrix; pre-multiplying the target matrix by the target column vector to obtain a transformation column vector; determining the geometric transformation relation of the first images and the at least two second images according to the transformation column vector. The second image collection includes at least two second images.

In some embodiments, the process of obtaining coordinates of three non-collinear pixels in the first image includes: obtaining coordinates of three non-collinear feature points of the first image.

In some embodiments, the method further includes obtaining the coordinates of the feature points of the first image to form a first coordinate collection; for the at least two second images in the second image collection, obtaining coordinates of feature points of the at least two second images matching feature points indicated by a first coordinate in the first coordinate collection to form a second coordinate collection; according to the geometric transformation relation of the first image and the at least two second images and the first coordinate collection, determining a second coordinate in the second coordinate collection as a target second coordinate; a feature point indicated by the target second coordinate is a mismatched feature point.

In some embodiments, the process of according to the coordinate collection, generating a target matrix includes: according to the coordinate collection, generating a first matrix, and determining an inverse matrix of the first matrix as the target matrix.

In some embodiments, the corresponding coordinates in the corresponding coordinate collection respectively indicate a first corresponding pixel, a second corresponding pixel and a third corresponding pixel; and elements in the target column vector are valued as follows: an element in a first row is valued as a first directional coordinate of the first corresponding pixel; an element in a second row is valued as a second directional coordinate of the first corresponding pixel; an element in a third row is valued as a first directional coordinate of the second corresponding pixel; an element in a fourth row is valued as a second directional coordinate of the second corresponding pixel; an element in a fifth row is valued as a first directional coordinate of the third corresponding pixel; an element in a sixth row is valued as a second directional coordinate of the third corresponding pixel.

In some embodiments, the process of determining the geometric transformation relation of the first images and the at least two second images includes: generating a transformation matrix with three rows and three columns configured for indicating the geometric transformation relation between the first image and the at least two second images according to the transformation column vector; elements in the transformation column vector are valued as below: a value of a first element in a first row is a value of an element in a first row of the transformation column vector; a value of a second element in a first row is a value of an element in a second row of the transformation column vector; a value of a third element in a first row is a value of an element in a third row of the transformation column vector; a value of a first element in a second row is a value of an element in a fourth row of the transformation column vector; a value of a second element in a second row is a value of an element in a fifth row of the transformation column vector; a value of a third element in a second row is a value of an element in a sixth row of the transformation column vector; values of a first element and a second element in a third row are zero; a value of a third element in the third row is one.

In some embodiments, coordinates in the coordinate collection respectively indicate a first pixel, a second pixel and a third pixel; and elements in the first matrix are valued as below: a first element in a first row and a fourth element in a second row are valued as a first directional coordinate of the first pixel; a second element in the first row and a fifth element in the second row are valued as a second directional coordinate of the first pixel; a third element in the first row and a sixth element in the second row are valued as one; a fourth element, a fifth element and a sixth element in the first row are valued as zero; a first element, a second element and a third element in the second row are valued as zero; a first element in a third row and a fourth element in a fourth row are valued as a first directional coordinate of the second pixel; a second element in the third row and a fifth element in the fourth row are valued as a second directional coordinate of the second pixel; a third element in the third row and a sixth element in the fourth row are valued as one; a fourth element, a fifth element and a sixth element in the third row are valued as zero; a first element, a second element and a third element in the fourth row are valued as zero; a first element in a fifth row and a fourth element in a sixth row are valued as a first directional coordinate of the third pixel; a second element in the fifth row and a fifth element in the sixth row are valued as a second directional coordinate of the third pixel; a third element in the fifth row and a sixth element in the sixth row are valued as one; a fourth element, a fifth element and a sixth element in the fifth row are valued as zero; a first element, a second element and a third element in the sixth row are valued as zero.

In a second aspect, an embodiment of the disclosure provides a device for determining geometric transformation relation for images. The device includes an obtaining unit disposed to obtain a first image and a second image collection, a generating unit disposed to generate a target matrix according to the coordinate collection; and a determining unit disposed to obtain coordinates of pixels in the at least two second images corresponding to coordinate-indicative pixels in the coordinate collection to form a corresponding coordinate collection for the at least two second images in the second image collection, generate a target column vector matching a column number of the target matrix according to the corresponding coordinate collection, pre-multiply the target matrix by the target column vector to obtain a transformation column vector, and determine the geometric transformation relation of the first images and the at least two second images according to the transformation column vector. The second image collection includes at least two second images; the obtaining unit is further disposed to obtain coordinates of three non-collinear pixels in the first image to form a coordinate collection.

In some embodiments, the obtaining unit is further disposed to: obtain coordinates of three non-collinear feature points of the first image.

In some embodiments, the obtaining unit is further disposed to: obtain the coordinates of the feature points of the first image to form a first coordinate collection; and the determining unit is further disposed to obtain coordinates of feature points of the at least two second images matching feature points indicated by a first coordinate in the first coordinate collection to form a second coordinate collection for the at least two second images in the second image collection, and determine a second coordinate in the second coordinate collection as a target second coordinate according to the geometric transformation relation of the first image and the at least two second images and the first coordinate collection; a feature point indicated by the target second coordinate is a mismatched feature point.

In some embodiments, the generating unit is further disposed to: according to the coordinate collection, generate a first matrix, and determine an inverse matrix of the first matrix as the target matrix.

In some embodiments, corresponding coordinates in the corresponding coordinate collection respectively indicate a first corresponding pixel, a second corresponding pixel and a third corresponding pixel; and elements in the target column vector are valued as follows: an element in a first row is valued as a first directional coordinate of the first corresponding pixel; an element in a second row is valued as a second directional coordinate of the first corresponding pixel; an element in a third row is valued as a first directional coordinate of the second corresponding pixel; an element in a fourth row is valued as a second directional coordinate of the second corresponding pixel; an element in a fifth row is valued as a first directional coordinate of the third corresponding pixel; an element in a sixth row is valued as a second directional coordinate of the third corresponding pixel.

In some embodiments, the determining unit is further disposed to: generate a transformation matrix with three rows and three columns configured for indicating the geometric transformation relation between the first image and the at least two second images according to the transformation column vector; elements in the transformation column vector are valued as below: a value of a first element in a first row is a value of an element in a first row of the transformation column vector; a value of a second element in a first row is a value of an element in a second row of the transformation column vector; a value of a third element in a first row is a value of an element in a third row of the transformation column vector; a value of a first element in a second row is a value of an element in a fourth row of the transformation column vector; a value of a second element in a second row is a value of an element in a fifth row of the transformation column vector; a value of a third element in a second row is a value of an element in a sixth row of the transformation column vector; values of a first element and a second element in a third row are zero; a value of a third element in the third row is one.

In some embodiments, coordinates in the coordinate collection respectively indicate a first pixel, a second pixel and a third pixel; and elements in the first matrix are valued as below: a first element in a first row and a fourth element in a second row are valued as a first directional coordinate of the first pixel; a second element in the first row and a fifth element in the second row are valued as a second directional coordinate of the first pixel; a third element in the first row and a sixth element in the second row are valued as one; a fourth element, a fifth element and a sixth element in the first row are valued as zero; a first element, a second element and a third element in the second row are valued as zero; a first element in a third row and a fourth element in a fourth row are valued as a first directional coordinate of the second pixel; a second element in the third row and a fifth element in the fourth row are valued as a second directional coordinate of the second pixel; a third element in the third row and a sixth element in the fourth row are valued as one; a fourth element, a fifth element and a sixth element in the third row are valued as zero; a first element, a second element and a third element in the fourth row are valued as zero; a first element in a fifth row and a fourth element in a sixth row are valued as a first directional coordinate of the third pixel; a second element in the fifth row and a fifth element in the sixth row are valued as a second directional coordinate of the third pixel; a third element in the fifth row and a sixth element in the sixth row are valued as one; a fourth element, a fifth element and a sixth element in the fifth row are valued as zero; a first element, a second element and a third element in the sixth row are valued as zero.

In a third aspect, an embodiment of the disclosure provides an electronic device. The electronic device includes one or more processors and a storage device stored with one or more programs therein; and when the one or more programs are executed by the one or more processors, the one or more processors perform any method in the first aspect.

In a fourth aspect, an embodiment of the disclosure provides a computer readable medium, stored with a computer program therein. The computer program is executed by a processor to perform any method according to the first aspect.

The method and the device for determining geometric transformation relation for images provided by the embodiments of the disclosure obtain the first image and the second image collection, obtain coordinates of three non-collinear pixels in the first image to form a coordinate collection; according to the coordinate collection, generate a target matrix; and for the at least two second images in the second image collection, obtain coordinates of pixels in the at least two second images corresponding to coordinate-indicative pixels in the coordinate collection to form a corresponding coordinate collection; according to the corresponding coordinate collection, generate a target column vector matching a column number of the target matrix; pre-multiply the target matrix by the target column vector to obtain a transformation column vector; determine the geometric transformation relation of the first images and the at least two second images according to the transformation column vector. The second image collection includes at least two second images. As a result, in a scenario of the first image corresponding to numerous second images, when the geometric transformation relation of the first image and each second image is solved, the solving process can be done only by utilizing the target matrix for the matrix multiplication in a manner of first generating the target matrix, which can accelerate the arithmetic speed of the solving process.

BRIEF DESCRIPTION OF THE DRAWINGS

According to the detailed description of unlimited embodiments with reference to figures as below, other features, objectives and advantages of the disclosure will be more obvious.

DETAILED DESCRIPTION OF PREFERRED EMBODIMENTS

The present application will be further described in detail in combination with accompanying drawings and embodiments. It should be understood that specific embodiments described herein are only for the purpose of explanation of the relevant invention, rather than to limit the invention. It should also be noted that, for convenience of description, only portions related to the relevant invention are shown in the accompanying drawings.

It should be noted that, in the case of no conflict, the embodiments of the present application and features of the embodiments can be combined with each other. The present application will be described in detail below with reference to the accompanying drawings in combination with the embodiments.

Figure 1:
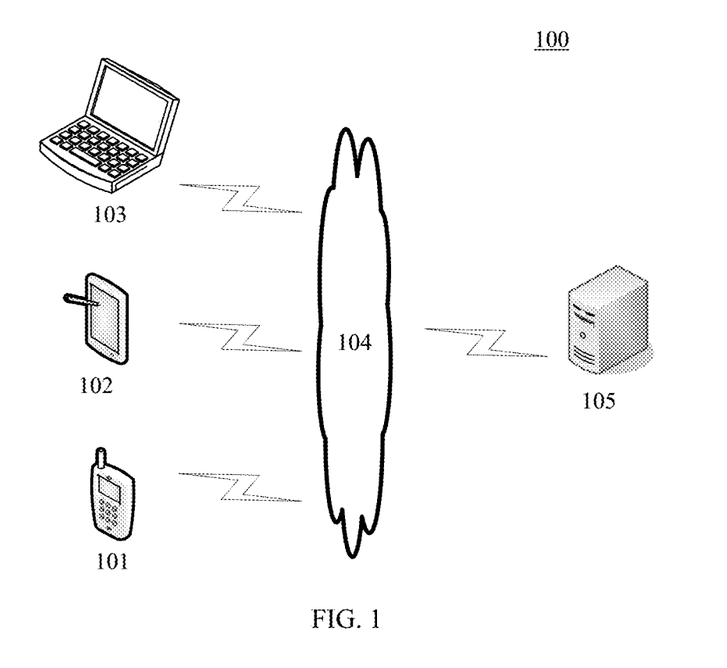
FIG. 1 is an exemplary system architecture diagram applied with an embodiment of the disclosure.

FIG. 1 shows an exemplary architecture 100 able to employ a method for determining geometric transformation relation for images or a device for determining geometric transformation relation for images of an embodiment of the disclosure.

As shown in FIG. 1, system architecture 100 may comprise terminal equipment 101, 102 and 103, a network 104 and a server 105. The network 104 is used for providing a medium of a communication link between the terminal equipment 101, 102 and 103 and the server 105. The network 104 may comprise various connection types, such as wired and wireless communication links or an optical fiber.

The terminal equipment 101, 102 and 103 interact with the server 105 via the network 104 to receive or send messages. Various client applications, such as web browser applications, search applications, and image processing applications, can be installed in the terminal equipment 101, 102 and 103.

The terminal equipment 101, 102 and 103 may be hardware or software. When being hardware, the terminal equipment 101, 102 and 103 may be various kinds of electronic equipment capable of supporting image storage and image processing, including but not limited to smart phones, tablet personal computers, e-book readers, laptop portable computers, desk computers, etc. When being software, the terminal equipment 101, 102 and 103 can be installed in the electronic equipment listed above. The terminal equipment may be implemented as multiple pieces of software or software modules (such as multiple pieces of software or software modules used for providing distributed service), may also be implemented as a single piece of software or software module, which is not limited herein.

The server 105 may be the one for providing various services, such as an image processing server used for extracting feature points of images to be processed sent by the terminal equipment 101, 102 and 103. The image processing server can process a received first image and at least two second images, and respectively solve geometric transformation relations of the first image and each second image, and further can return the solved result to the terminal device.

It should be noted that the above images to be processed may also be directly locally stored in the server 105, so that the server 105 may directly extract the locally stored images to be processed for processing, at the moment, the images to be processed may be not stored in the terminal equipment 101, 102 and 103 and the network 104.

It should be noted that a method for determining geometric transformation relation for images provided by an embodiment of the present application is generally executed by the server 105, and correspondingly, a device for determining geometric transformation relation for images is generally arranged in the server 105.

It should also be noted that image processing applications may be installed in the terminal equipment 101, 102 and 103; the terminal equipment 101, 102 and 103 may also process images to be processed based on the image processing applications, at the moment, the method for processing the feature points of the images may also be executed by the terminal equipment 101, 102 and 103, and correspondingly, the device for processing the feature points of the images may also be arranged in the terminal equipment 101, 102 and 103. At the moment, the exemplary system architecture 100 may not comprise the server 105 and the network 104.

It should be noted that the server may be hardware or software. When being hardware, the server may be implemented as a distributed server cluster including a plurality of servers, and may also be implemented as the single server. When being software, the server may be implemented as multiple pieces of software or software modules (such as multiple pieces of software or software modules used for providing distributed service), and may also be implemented as a single piece of software or software module, which is not limited herein.

It should be understood that numbers of the terminal equipment, the network and the server in FIG. 1 are exemplary only. Any number of terminal equipment, networks and servers may be provided according to implementation requirements.

Figure 2:
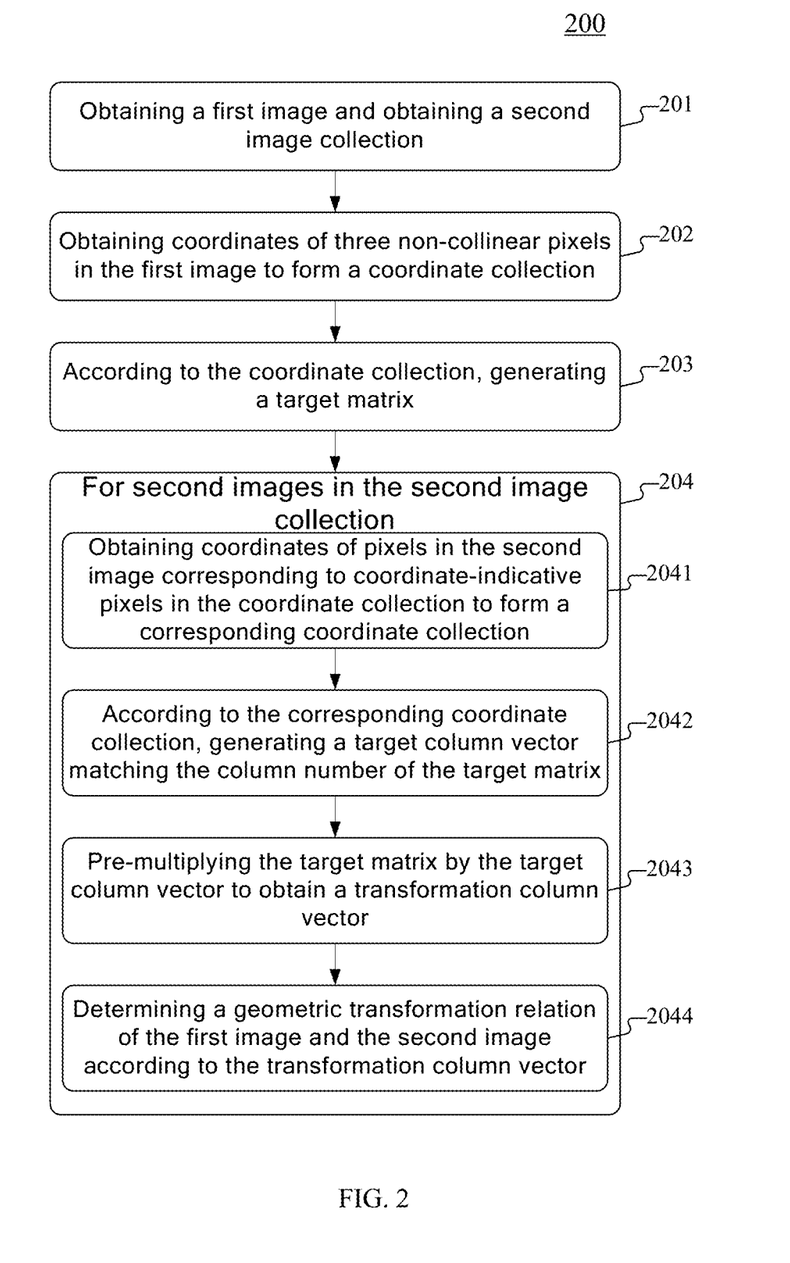
FIG. 2 is a flowchart of a method for determining geometric transformation relation for images according to an embodiment of the disclosure.

Referring to FIG. 2, FIG. 2 shows a flowchart 200 of a method for determining geometric transformation relation for images according to an embodiment of the disclosure. The method for determining geometric transformation relation for images includes following steps.

Step 201, a first image and a second image collection are obtained.

In the embodiment, an executive body (as a server 105 shown in FIG. 1) for determining geometric transformation relation for images can first obtain the first image and the second image collection from local or other storage devices. The second image collection includes at least two images. Conceivably, the executive body above can further obtain the first image locally, and obtain the second image collection from other storage devices, or obtain the first image from other storage devices, and obtain the second image collection locally.

Step 202, coordinates of three non-collinear pixels in the first image are obtained to form a coordinate collection.

In the embodiment, the three non-collinear pixels can be three non-collinear pixels randomly selected from the first image, or three non-collinear pixels assigned by a technician, or coordinates of three non-collinear pixels selected according to a predetermined pixel selection method (such as first dividing the first image into three image regions, and then selecting a pixel respectively from each of the three image regions).

Step 203, according to the coordinate collection, a target matrix is generated.

In the embodiment, a row number, a column number and a relation between a value of each element in the target matrix and the coordinate collection can be predisposed by a technician. Then, according to a specific coordinate collection, the target matrix is obtained by various generation methods.

Optionally, according to the coordinate collection, a first matrix can be first generated. Then, an inverse matrix of the first matrix can be determined to be a target matrix. A row number, a column number and a relation between a value of each element in the first matrix and the coordinate collection can be predisposed by a technician. Then, according to the specific coordinate collection, the first matrix is obtained.

For instance, taking coordinates in the coordinate collection respectively indicating a first pixel, a second pixel and a third pixel in the first image as an example, the first matrix can be a square matrix with six rows and six columns. Values of elements in the first matrix can be disposed as follows.

A first element in the first row and a fourth element in the second row are valued as a first directional coordinate of a first pixel; a second element in the first row and a fifth element in the second row are valued as a second directional coordinate of the first pixel. A third element in the first row and a sixth element in the second row are valued as one; a fourth element, a fifth element and a sixth element in the first row are valued as zero. The first element, the second element and the third element in the second row are valued as zero.

A first element in the third row and a fourth element in the fourth row are valued as a first directional coordinate of a second pixel; a second element in the third row and a fifth element in the fourth row are valued as a second directional coordinate of the second pixel. A third element in the third row and a sixth element in the fourth row are valued as one; a fourth element, a fifth element and a sixth element in the third row are valued as zero. The first element, the second element and the third element in the fourth row are valued as zero.

A first element in the fifth row and a fourth element in the sixth row are valued as a first directional coordinate of a third pixel; a second element in the fifth row and a fifth element in the sixth row are valued as a second directional coordinate of the third pixel. A third element in the fifth row and a sixth element in the sixth row are valued as one; a fourth element, a fifth element and a sixth element in the fifth row are valued as zero. The first element, the second element and the third element in the sixth row are valued as zero.

As an example, a coordinate of the first pixel can be (X1, Y1); a coordinate of the second pixel can be (X2, Y2); a coordinate of the third pixel can be (X3, Y3); the first matrix can be formed according to the forgoing method as below.

$$\begin{bmatrix} X1 & Y1 & 1 & 0 & 0 & 0 \\ 0 & 0 & 0 & X1 & Y1 & 1 \\ X2 & Y2 & 1 & 0 & 0 & 0 \\ 0 & 0 & 0 & X2 & Y2 & 1 \\ X3 & Y3 & 1 & 0 & 0 & 0 \\ 0 & 0 & 0 & X3 & Y3 & 1 \end{bmatrix}.$$

Then, the inverse matrix of the first matrix can be the target matrix. The target matrix is $$\begin{bmatrix} X1 & Y1 & 1 & 0 & 0 & 0 \\ 0 & 0 & 0 & X1 & Y1 & 1 \\ X2 & Y2 & 1 & 0 & 0 & 0 \\ 0 & 0 & 0 & X2 & Y2 & 1 \\ X3 & Y3 & 1 & 0 & 0 & 0 \\ 0 & 0 & 0 & X3 & Y3 & 1 \end{bmatrix}^{-1}.$$

Conceivably, taking the forgoing target matrix with six rows and six columns as an example, the target matrix can further be a series of other matrices obtained from transformation by a unit matrix based on the matrix with six rows and six columns.

Optionally, it further can obtain the target matrix according to a pre-trained target matrix generation model. The target matrix generation model can be configured for indicating a corresponding relation of the coordinate collection and the target matrix. Specifically, it can the obtain target matrix generation model after training by following steps.

Step 1), a large number of training samples are obtained. Each training sample includes a coordinate collection composed of three coordinates, and a target matrix corresponding to the coordinate collection.

Step 2), an initialized target matrix generation model is obtained. The initialized target matrix generation model can be untrained convolution neural network or incompletely trained convolution neural network. Parameters of the initialized target matrix generation model (such as initial parameters of each layer) can be consistently adjusted in the training process.

Step 3), the coordinate collection in the training sample is taken as the input of the initialized target matrix generation model, and the target matrix corresponding to the input coordinate collection is taken as an expected output for training; the target matrix generation model can be obtained.

Step 204, for the second images in the second image collection, the geometric transformation relation between the first image and the second images can be determined by following steps.

Step 2401, coordinates of pixels in the second images corresponding to coordinate-indicative pixels in the coordinate collection are obtained to form a corresponding coordinate collection.

In the step, it can obtain predisposed coordinates of pixels in the second images corresponding to pixels in the first image indicated by each coordinate in the coordinate collection, or can obtain coordinates in the second images corresponding to coordinate-indicative pixels in the coordinate collection by various conventional image matching algorithms.

Step 2402, according to a corresponding coordinate collection, target column vectors matching the column number of the target matrix are generated.

In the step, the target column vectors and the column number of the forgoing target matrix match. Taking the target matrix with six rows and six columns exemplary above as an example, correspondingly, the row number of the target column vectors should be six. The relation between the value of each element in the target column vector and the corresponding coordinate collection can be predisposed by a technician. Then, according to the corresponding coordinate collection, the target column vector is obtained.

Corresponding coordinates in the corresponding coordinate collection respectively directing a first corresponding pixel, a second corresponding pixel and a third corresponding pixel in the second images can be taken as an example. The elements in the target column vector are valued as follows. The elements in the first row are valued as the first directional coordinate of the first corresponding pixel. The elements in the second row are valued as the second directional coordinate of the first corresponding pixel. The elements in the third row are valued as the first directional coordinate of the second corresponding pixel. The elements in the fourth row are valued as the second directional coordinate of the second corresponding pixel. The elements in the fifth row are valued as the first directional coordinate of the third corresponding pixel. The elements in the sixth row are valued as the second directional coordinate of the third corresponding pixel.

As an example, the coordinate of the first corresponding pixel is (X1', Y1'); the coordinate of the second pixel is (X2', Y2'); the coordinate of the third pixel is (X3', Y3'); the target column vector can be formed by the forgoing method.

$$\begin{bmatrix} X1' \\ Y1' \\ X2' \\ Y2' \\ X3' \\ Y3' \end{bmatrix}.$$

Conceivably, taking the target column vector with six rows as an example, the target column vector can further be a series of other column vectors obtained from transformation by a unit matrix based on the matrix with six rows.

Step 2043, the target matrix is pre-multiplied by the target column vector to obtain a transformation column vector.

Step 2044, geometric transformation relation for the first image and the second image is determined according to the transformation column vector.

In the embodiment, elements in the transformation column vector can act as geometric transformation parameters of the geometric transformation relation between the first image and the second image.

Optionally, elements in the transformation column vector can act as geometric transformation parameters of the first image and the second image. The geometric transformation relation between the first image and the second image can be determined by some conventional applications capable of performing geometric transformation.

Optionally, it further can directly generate the transformation matrix according to the transformation vector. The generated transformation matrix is configured for indicating the geometric transformation relation of the first image and the second image.

Taking the forgoing target matrix with six rows and six columns and the target column vector with six rows as examples, the obtained transformation column vector is a column vector with six rows. Six elements in the obtained transformation column vector can form a transformation matrix with three rows and three columns. Specifically, elements in the transformation matrix can be valued as follow.

A value of the first element in the first row can be a value of an element in the first row of the transformation column vector. A value of the second element in the first row can be a value of an element in the second row of the transformation column vector. A value of the third element in the first row can be a value of an element in the third row of the transformation column vector.

A value of the first element in the second row can be a value of an element in the fourth row of the transformation column vector. A value of the second element in the second row can be a value of an element in the fifth row of the transformation column vector. A value of the third element in the second row can be a value of an element in the sixth row of the transformation column vector.

Values of the first element and the second element in the third row are zero. A value of the third element in the third row is one.

As an example, six elements in the transformation column vector respectively are "a", "b", "c", "d", "e" and "f". The corresponding transformation matrix can be:

$$\begin{bmatrix} a & b & c \\ d & e & f \\ 0 & 0 & 1 \end{bmatrix}.$$

The method for determining geometric transformation relation for images provided by the forgoing embodiments of the disclosure pre-generates the target matrix according to coordinates of three non-collinear pixels in the first image, thereby directly determining the geometric transformation relation of the first image and each second image according to a product of the target matrix and the target column vector formed by coordinates of corresponding pixels in the second image in the process of determining the geometric transformation relations of the first image and other numerous second images. In the process of solving the geometric transformation relation between the first image and each second image, the process of determining the target matrix is omitted, which can increase the solving speed.

Figure 3:
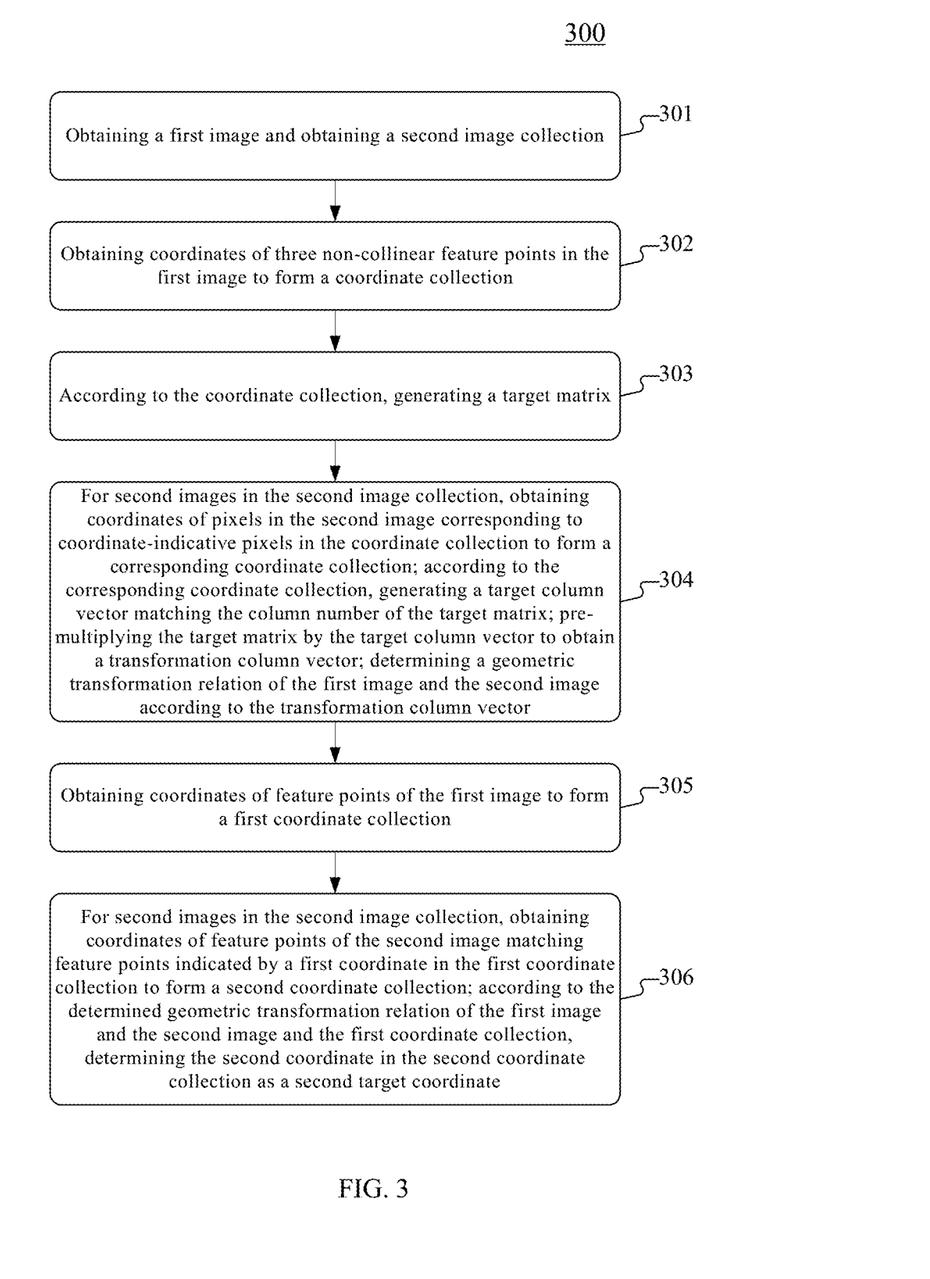
FIG. 3 is a flowchart of a method for determining geometric transformation relation for images according to another embodiment of the disclosure.

Referring to FIG. 3, FIG. 3 shows a process 300 of a method for determining geometric transformation relation for images according to another embodiment. The process 300 of a method for determining geometric transformation relation for images includes following steps.

S301, a first image and a second image collection are obtained.

A specific process of the step can be referred to the relative illustration of step 201 in the embodiment corresponding to FIG. 2, which will not be repeated herein.

Step 302, coordinates of three non-collinear feature points in the first image are obtained to form a coordinate collection.

In the embodiment, feature points can be extracted from the first image by various conventional algorithms applied for extracting feature points of an image. Then, three non-collinear feature points are selected from the feature points of the first image, and coordinates of the three selected feature points are formed to be a coordinate collection.

The three feature points can be three random feature points in the first image, or selected according to a predetermined rule, or three feature points assigned by a technician.

Step 303, according to the coordinate collection, the target matrix is generated.

Step 304, for the second images in the second image collection, coordinates of pixels in the second images corresponding to coordinate-indicative pixels in the coordinate collection are obtained to form a corresponding coordinate collection; according to the corresponding coordinate collection, the target column vector corresponding to/matching the column number of the target matrix is generated; the target matrix is pre-multiplied by the target column vector to obtain the transformation column vector. The geometric transformation relation of the first image and the second image is determined according to the transformation column vector.

The specific processes of forgoing steps 303 and 304 can be referred to steps 203 and 204 in the embodiment corresponding to FIG. 2, which will not be repeated herein.

Step 305, coordinates of feature points of the first image are obtained to form a first coordinate collection.

In the embodiment, the process of the step 302 above can be referred. The coordinate of each feature point of the first image is obtained by an algorithm extracting feature points.

Step 306, for the second images in the second image collection, coordinates of feature points of the second image corresponding to/matching the feature points indicated by the first coordinate in the first coordinate collection are obtained to form a second coordinate collection; according to the determined geometric transformation relation of the first image and the second image, and the first coordinate collection, the second coordinate in the second coordinate collection is determined as a target second coordinate.

In the embodiment, the second coordinate collection can be pre-collected and determined, or directly obtained by an image matching method. The feature points indicated by the target second coordinate can be mismatched feature points.

Optionally, the target second coordinate can be determined from the second coordinate collection by following steps.

Step 1), for each feature point in the first image, the determined geometric transformation relation with each second image can be utilized to project each feature point into each second image to obtain the coordinate of the projection of each feature point in the second image.

Step 2), for each second image, the corresponding coordinate in the second image of each feature point in the first image is obtained by the step 1) above. Then, each feature point can be verified respectively.

Specifically, for each feature point, it can compare the coordinate of the feature point corresponding in the second image determined by the geometric transformation relation with the obtained second coordinate matching the feature point; whether the second coordinated matching the feature point is a mismatched feature point, namely the target feature point, can be determined by the comparison result.

For instance, if a distance between the coordinate of the feature point corresponding in the second image determined by the geometric transformation relation and the obtained second coordinate matching the feature point is shorter than a predetermined distance threshold, the second coordinate matching the feature point can be deemed as a correctly matched feature point. Conversely, if the distance between the coordinate of the feature point corresponding in the second image determined by the geometric transformation relation and the obtained second coordinate matching the feature point is longer than the predetermined distance threshold, the second coordinate matching the feature point can be deemed as a mismatched feature point.

Optionally, it further can respectively project feature points in the first image into each second image according to the determined geometric transformation relation. For each feature point of the first image, if a coordinate-indicative position of the feature point projected into the second image is in a predisposed image region, the second coordinate matching the feature point can be deemed as a correctly matched feature point. Conversely, if the coordinate-indicative position of the feature point projected into the second image is out of the predisposed image region, the second coordinate matching the feature point can be deemed as a mismatched feature point.

Figure 4:
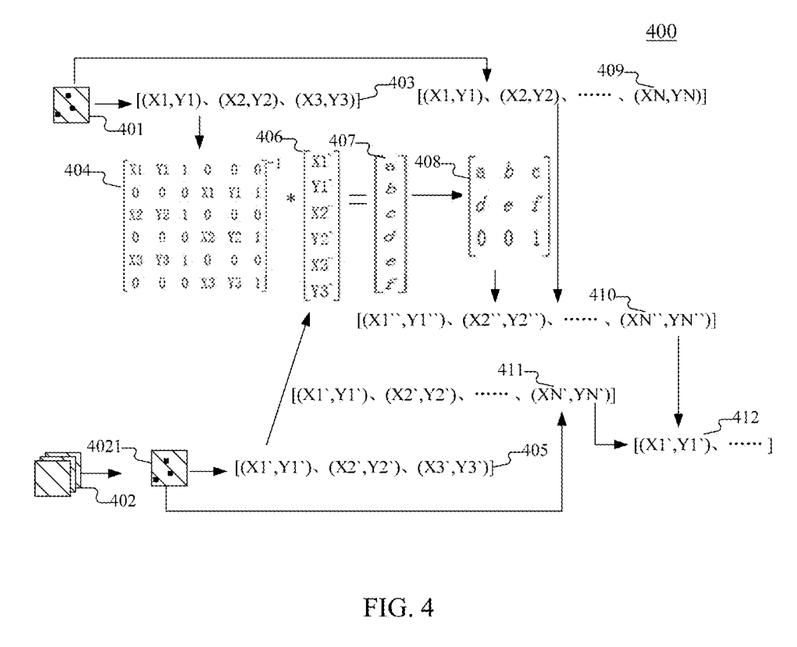
FIG. 4 is a schematic view of an application scenario of a method for determining geometric transformation relation for images according to an embodiment of the disclosure.

Referring to FIG. 4, FIG. 4 is a schematic view of an application scenario of a method for determining geometric transformation relation for images according to the embodiment. In an application scenario of FIG. 4, coordinates of three non-collinear feature points in the first image 401 are shown as the mark 403 therein, which respectively are (X1, Y1), (X2, Y2) and (X3, Y3). The second image collection 402 includes numerous second images, and one second image 4021 therein will be taken as an example to illustrate as below. A target matrix 404 generated according to three non-collinear feature points in the first image 401 is shown as below.

$$\begin{bmatrix} X1 & Y1 & 1 & 0 & 0 & 0 \\ 0 & 0 & 0 & X1 & Y1 & 1 \\ X2 & Y2 & 1 & 0 & 0 & 0 \\ 0 & 0 & 0 & X2 & Y2 & 1 \\ X3 & Y3 & 1 & 0 & 0 & 0 \\ 0 & 0 & 0 & X3 & Y3 & 1 \end{bmatrix}^{-1}.$$

Three feature points in the second image 4021 corresponding to three feature points of (X1, Y1), (X2, Y2) and (X3, Y3) in the first image 401 above are shown as the mark 405 therein, which respectively are (X1', Y1'), (X2', Y2') and (X3, Y3'). Then, the target column vector 406 can be generated as below.

$$\begin{bmatrix} X1' \\ Y1' \\ X2' \\ Y2' \\ X3' \\ Y3' \end{bmatrix}.$$

Then, the target matrix can be pre-multiplied by the target column vector 406 to obtain a transformation column vector 407. The transformation column vector 407 is shown as below.

$$\begin{bmatrix} a \\ b \\ c \\ d \\ e \\ f \end{bmatrix}.$$

Then, according to the transformation column vector 407, it can form a transformation matrix 408 to indicate the geometric transformation relation of the first image 401 and the second image 4021. The transformation matrix 408 is shown as below.

$$\begin{bmatrix} a & b & c \\ d & e & f \\ 0 & 0 & 1 \end{bmatrix}.$$

Subsequently, coordinates of the feature points of the first image 401 can be obtained to form a first coordinate collection 409. Then, each first coordinate in the first coordinate collection 409 can be converted by the transformation matrix 408 and projected into the second image 4021 to obtain a projection coordinate collection 410. Next, coordinates in the second image 4021 matching the first coordinates in the first coordinate collection can be obtained to form a second coordinate collection 411.

Then, it can respectively compare coordinates in the projection coordinate collection 410 with those in the second coordinate collection 411. For instance, it can calculate a distance between the first coordinate in the projection coordinate collection 410 and the first coordinate in the second coordinate collection. If the distance is longer than a predetermined threshold, the feature point indicated by the first coordinate in the second coordinate collection 411 is a mismatched feature point of the corresponding feature point indicated by the first coordinate, and it can determine the feature point indicated by the first coordinate in the second coordinate collection 411 as a target feature point.

Similarly, it can use the same method to compare the projection coordinate collection 410 and the second coordinate collection 411 to determine a coordinate collection 412 of target feature points.

After determining the geometric transformation relations between the first image and each second image in the second image collection, regarding each second image, the method for determining geometric transformation relation for images provided by the forgoing embodiments of the disclosure can further utilize the determined geometric transformation relations to solve feature points in the second image projected by the feature point in the first image. Then, it can compare the feature points projected into the second image with the obtained feature points in the second image matching the feature points of the first image to select possibly mismatched feature points. Therefore, when the number of second images is considerable, the forgoing method can accelerate to determine the geometric transformation relations between the first image and each second image, and the geometric transformation relations can further be utilized to verify the matched feature points in the second image, which can further result in accelerating the geometric verification.

Figure 5:
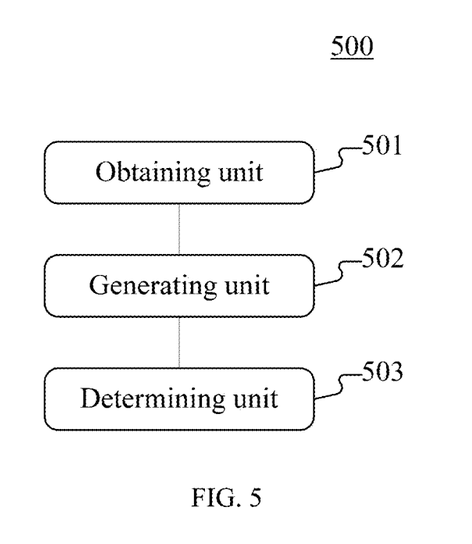
FIG. 5 is a structural schematic view of a device for determining geometric transformation relation for images according to an embodiment of the disclosure.

Referring to FIG. 5, as the implement of the method shown in each figure above, the disclosure provides an embodiment of a device for determining geometric transformation relation for images. The device embodiment is corresponding to the method embodiment as shown in FIG. 2. The device specifically can be used in various electronic devices.

As shown in FIG. 5, a device 500 for determining geometric transformation relation for images provided by the embodiment includes an obtaining unit 501, a generating unit 502 and a determining unit 503. The obtaining unit 501 is disposed to obtain a first image and a second image collection; the second image collection includes at least two second images; the obtaining unit 501 is further disposed to obtain coordinates of three non-collinear pixels in the first image to form a coordinate collection; the generating unit 502 is disposed to generate a target matrix according to the coordinate collection; and the determining unit 503 is disposed to obtain coordinates of pixels in the at least two second images corresponding to coordinate-indicative pixels in the coordinate collection to form a corresponding coordinate collection for the at least two second images in the second image collection, generate a target column vector matching a column number of the target matrix according to the corresponding coordinate collection, pre-multiply the target matrix by the target column vector to obtain a transformation column vector, and determine the geometric transformation relation of the first images and the at least two second images according to the transformation column vector.

In the embodiment, in the device 500 for determining geometric transformation relation for images, specific processes of the obtaining unit 501, the generating unit 502 and the determining unit 503 and technical effects thereof can respectively be referred to relative illustrations of step 201, step 202, step 203 and step 204 in the embodiment corresponding to FIG. 2, which will not be repeated herein.

In some optional embodiments, the obtaining unit 501 is further disposed to: obtain coordinates of three non-collinear feature points of the first image.

In some optional embodiments, the obtaining unit 501 is further disposed to: obtain the coordinates of the feature points of the first image to form a first coordinate collection; and the determining unit 503 is further disposed to obtain coordinates of feature points of the at least two second images matching feature points indicated by a first coordinate in the first coordinate collection to form a second coordinate collection for the at least two second images in the second image collection, and determine a second coordinate in the second coordinate collection as a target second coordinate according to the geometric transformation relation of the first image and the at least two second images and the first coordinate collection; a feature point indicated by the target second coordinate is a mismatched feature point.

In some optional embodiments, the generating unit 502 is further disposed to: according to the coordinate collection, generate a first matrix, and determine an inverse matrix of the first matrix as the target matrix.

In some optional embodiments, corresponding coordinates in the corresponding coordinate collection respectively indicate a first corresponding pixel, a second corresponding pixel and a third corresponding pixel; and elements in the target column vector are valued as follows: an element in a first row is valued as a first directional coordinate of the first corresponding pixel; an element in a second row is valued as a second directional coordinate of the first corresponding pixel; an element in a third row is valued as a first directional coordinate of the second corresponding pixel; an element in a fourth row is valued as a second directional coordinate of the second corresponding pixel; an element in a fifth row is valued as a first directional coordinate of the third corresponding pixel; an element in a sixth row is valued as a second directional coordinate of the third corresponding pixel.

In some optional embodiments, the determining unit 503 is further disposed to: generate a transformation matrix with three rows and three columns configured for indicating the geometric transformation relation between the first image and the at least two second images according to the transformation column vector; elements in the transformation column vector are valued as below: a value of a first element in a first row is a value of an element in a first row of the transformation column vector; a value of a second element in a first row is a value of an element in a second row of the transformation column vector; a value of a third element in a first row is a value of an element in a third row of the transformation column vector; a value of a first element in a second row is a value of an element in a fourth row of the transformation column vector; a value of a second element in a second row is a value of an element in a fifth row of the transformation column vector; a value of a third element in a second row is a value of an element in a sixth row of the transformation column vector; values of a first element and a second element in a third row are zero; a value of a third element in the third row is one.

In some optional embodiments, coordinates in the coordinate collection respectively indicate a first pixel, a second pixel and a third pixel; and elements in the first matrix are valued as below: a first element in a first row and a fourth element in a second row are valued as a first directional coordinate of the first pixel; a second element in the first row and a fifth element in the second row are valued as a second directional coordinate of the first pixel; a third element in the first row and a sixth element in the second row are valued as one; a fourth element, a fifth element and a sixth element in the first row are valued as zero; a first element, a second element and a third element in the second row are valued as zero; a first element in a third row and a fourth element in a fourth row are valued as a first directional coordinate of the second pixel; a second element in the third row and a fifth element in the fourth row are valued as a second directional coordinate of the second pixel; a third element in the third row and a sixth element in the fourth row are valued as one; a fourth element, a fifth element and a sixth element in the third row are valued as zero; a first element, a second element and a third element in the fourth row are valued as zero; a first element in a fifth row and a fourth element in a sixth row are valued as a first directional coordinate of the third pixel; a second element in the fifth row and a fifth element in the sixth row are valued as a second directional coordinate of the third pixel; a third element in the fifth row and a sixth element in the sixth row are valued as one; a fourth element, a fifth element and a sixth element in the fifth row are valued as zero; a first element, a second element and a third element in the sixth row are valued as zero.

In the device provided in the forgoing embodiments of the disclosure, the obtaining unit obtains the first image and the second image collection. The second image collection includes at least two second images. coordinates of three non-collinear pixels in the first image are obtained to form a coordinate collection; the generating unit generates a target matrix according to the coordinate collection; and for the at least two second images in the second image collection, coordinates of pixels in the at least two second images corresponding to coordinate-indicative pixels in the coordinate collection are obtained to form a corresponding coordinate collection; according to the corresponding coordinate collection, a target column vector matching a column number of the target matrix is generated; the target matrix is pre-multiplied by the target column vector to obtain a transformation column vector; determine the geometric transformation relation of the first images and the at least two second images according to the transformation column vector. As a result, in a scenario of the first image corresponding to numerous second images, when the geometric transformation relation of the first image and each second image is solved, the solving process can be done only by utilizing the target matrix for the matrix multiplication in a manner of first generating the target matrix, which can accelerate the arithmetic speed of the solving process.

Figure 6:
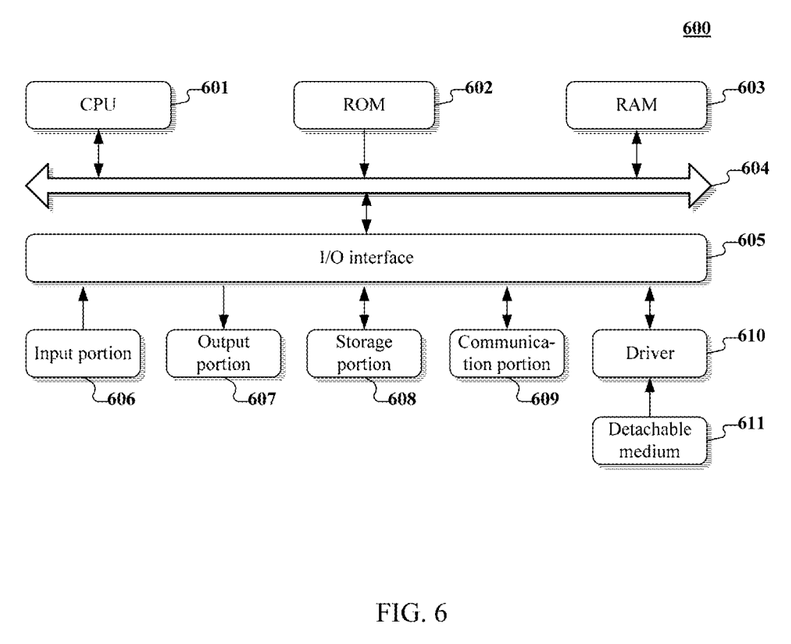
FIG. 6 is a structural schematic view of a computer system for implementing an electronic device adapted for an embodiment of the disclosure.

Reference is now made to FIG. 6 which shows a structure diagram of a computer system 600 of electronic equipment applicable to implementing an embodiment of the present application. The electronic equipment shown in FIG. 6 is merely an example and should not pose any limitation on functions and application ranges of the embodiments of the present application.

As shown in FIG. 6, the computer system 600 includes a central processing unit (CPU) 601 which can execute various appropriate actions and processes according to programs stored in a read-only memory (ROM) 602 or programs loaded to a random-access memory (RAM) 603 from a storage portion 608. Various programs and data required by operation of the system 600 are also stored in the RAM 603. The CPU 601, ROM 602 and RAM 603 are connected to one another through a bus 604. An input/output (I/O) interface 605 is also connected to the bus 604.

The I/O interface 605 is connected with following components: an input portion 606 including a keyboard, a mouse, etc.; an output portion 607 including a cathode-ray tube (CRT), a liquid crystal display (LCD), a loudspeaker, etc.; a storage portion 608 including a hard disk, etc.; and a communication portion 609 including a network interface card such as an LAN card and a modem. The communication portion 609 executes communication through networks such as the Internet. A driver 610 is also connected to the I/O interface 605 as required. A detachable medium 611, such as a magnetic disk, an optical disk, a magneto-optical disk and a semiconductor memory, is installed on the driver 610 as required, so that computer programs read from the detachable medium can be installed into the storage portion 608 as required.

Specifically, processes described above with reference to flowcharts may be implemented as computer software programs in accordance with embodiments of the present disclosure. For example, an embodiment of the present application comprises a computer program product which comprises a computer program carried on a computer readable medium, and the computer program comprises program codes used for executing the method shown in the flowchart. In such embodiment, the computer program may be downloaded from the network through the communication portion 609 and installed, and/or downloaded from the detachable medium 611 and installed. When the computer program is executed by the central processing unit (CPU) 601, a function defined in the method provided by the present application is executed.

It should be noted that the computer readable medium of the present application may be a computer readable signal medium or a computer readable storage medium, or any combination of the computer readable signal medium or the computer readable storage medium. The computer readable storage medium may be, for example, but is not limited to, an electronic, magnetic, optical, electromagnetic, infrared, or semiconductor system, apparatus, or device, or combination of any of the above. More specifically, the computer readable storage medium may include, but is not limited to, an electrical connector having one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the above. In the present application, the computer readable storage medium may be any tangible medium that contains or stores a program that can be used by or in combination with an instruction execution system, apparatus, or device. In the present application, a computer readable signal medium may include a data signal propagating in a baseband or as a part of a carrier wave, wherein computer readable program codes are carried in the data signal. Such propagated data signal may be in various forms, including but not limited to an electromagnetic signal, an optical signal, or any appropriate combination of the above. The computer readable signal medium may also be any computer readable medium other than the computer readable storage medium, and the computer readable medium can transmit, propagate, or transport the program used by or in combination with the instruction execution system, apparatus, or device. The program codes included in the computer readable medium may be transmitted via any appropriate medium, including but not limited to wireless, electrical wires, optical cables, RF, etc., or any appropriate combination of the above.

The flowcharts and block diagrams in the figures illustrate the possible system architecture, functions, and operation of systems, methods, and computer program products according to various embodiments of the present application. In view of this, each block in the flowcharts or block diagrams may represent a module, a program segment, or a portion of codes, and the module, the program segment or the portion of codes contains one or more executable instructions for implementing specified logical functions. It should also be noted that in some alternative implementations, the functions labeled in the blocks may be implemented according to an order different from the order labeled in the figures. For example, the two blocks shown in succession may, in fact, be executed substantially concurrently, or may sometimes be executed in a reverse order, depending upon the functions involved. It should also be noted that each block in the block diagrams and/or flowcharts, and combinations of blocks in the block diagrams and/or flowcharts can be implemented by dedicated hardware-based systems used for carrying out the specified functions or operation, or can be implemented by combinations of dedicated hardware and computer instructions.

Units described in the embodiments of the present application may be implemented in a software mode or in a hardware mode. The described units may also be arranged in a processor, for example, the units can be described as follows: a processor includes an obtaining unit, a generating unit, and a determining unit, and the names of the units do not, in some cases, constitute limitation on the units themselves. For instance, the obtaining unit can be described as a unit for obtaining a first image and a second image collection.

In another aspect, the present application also provides a computer readable medium which may be included in the electronic equipment described in the above embodiments, or may also present separately without being assembled into the electronic device. The above computer readable medium carries one or more programs. When one or more programs above are executed by the electronic device, the electronic device is enabled to obtain the first image and the second image collection, obtain coordinates of three non-collinear pixels in the first image to form a coordinate collection; according to the coordinate collection, generate a target matrix; and for the at least two second images in the second image collection, obtain coordinates of pixels in the at least two second images corresponding to coordinate-indicative pixels in the coordinate collection to form a corresponding coordinate collection; according to the corresponding coordinate collection, generate a target column vector matching a column number of the target matrix; pre-multiply the target matrix by the target column vector to obtain a transformation column vector; determine the geometric transformation relation of the first images and the at least two second images according to the transformation column vector. The second image collection includes at least two second images.

The above description is merely the illustration of preferred embodiments of the present application and the technical principles used. It should be understood by those skilled in the art that the scope of the present application referred to herein is not limited to technical solutions formed by specific combinations of the above technical features, but also contains other technical solutions formed by any combination of the above technical features or equivalent features thereof without departing from the above inventive concept, such as, technical solutions formed by interchanging the above features with (but not limited to) the technical features with similar functions disclosed in the present application.

What is claimed is:

1. A method for determining geometric transformation relation for images, comprising:

obtaining a first image and a second image collection; wherein the second image collection comprises at least two second images;

obtaining coordinates of three non-collinear pixels in the first image to form a coordinate collection;

generating a target matrix according to the coordinate collection; and for the at least two second images in the second image collection, obtaining coordinates of pixels in the at least two second images corresponding to coordinate-indicative pixels in the coordinate collection to form a corresponding coordinate collection;

according to the corresponding coordinate collection, generating a target column vector matching a column number of the target matrix; pre-multiplying the target matrix by the target column vector to obtain a transformation column vector; determining the geometric transformation relation of the first images and the at least two second images according to the transformation column vector; wherein elements in the transformation column vector act as geometric transformation parameters of the geometric transformation relation between the first images and the at least two second images.

2. The method according to claim 1, wherein the obtaining coordinates of three non-collinear pixels in the first image comprises:

obtaining coordinates of three non-collinear feature points of the first image.

3. The method according to claim 2, wherein the method further comprises:

obtaining the coordinates of the feature points of the first image to form a first coordinate collection; and for the at least two second images in the second image collection, obtaining coordinates of feature points of the at least two second images matching feature points indicated by a first coordinate in the first coordinate collection to form a second coordinate collection; according to the geometric transformation relation of the first image and the at least two second images and the first coordinate collection, determining a second coordinate in the second coordinate collection as a target second coordinate; wherein a feature point indicated by the target second coordinate is a mismatched feature point.

4. The method according to claim 1, wherein generating a target matrix according to the coordinate collection comprises:

according to the coordinate collection, generating a first matrix, and determining an inverse matrix of the first matrix as the target matrix.

5. The method according to claim 1, wherein corresponding coordinates in the corresponding coordinate collection respectively indicate a first corresponding pixel, a second corresponding pixel and a third corresponding pixel; and wherein elements in the target column vector are valued as follows: an element in a first row is valued as a first directional coordinate of the first corresponding pixel; an element in a second row is valued as a second directional coordinate of the first corresponding pixel; an element in a third row is valued as a first directional coordinate of the second corresponding pixel; an element in a fourth row is valued as a second directional coordinate of the second corresponding pixel; an element in a fifth row is valued as a first directional coordinate of the third corresponding pixel; an element in a sixth row is valued as a second directional coordinate of the third corresponding pixel.

6. The method according to claim 1, wherein the determining the geometric transformation relation of the first images and the at least two second images comprises:

generating a transformation matrix with three rows and three columns configured for indicating the geometric transformation relation between the first image and the at least two second images according to the transformation column vector; wherein elements in the transformation column vector are valued as below a value of a first element in a first row is a value of an element in a first row of the transformation column vector; a value of a second element in a first row is a value of an element in a second row of the transformation column vector; a value of a third element in a first row is a value of an element in a third row of the transformation column vector; a value of a first element in a second row is a value of an element in a fourth row of the transformation column vector; a value of a second element in a second row is a value of an element in a fifth row of the transformation column vector; a value of a third element in a second row is a value of an element in a sixth row of the transformation column vector; values of a first element and a second element in a third row are zero; a value of a third element in the third row is one.

7. The method according to claim 4, wherein coordinates in the coordinate collection respectively indicate a first pixel, a second pixel and a third pixel; and wherein elements in the first matrix are valued as below: a first element in a first row and a fourth element in a second row are valued as a first directional coordinate of the first pixel; a second element in the first row and a fifth element in the second row are valued as a second directional coordinate of the first pixel; a third element in the first row and a sixth element in the second row are valued as one; a fourth element, a fifth element and a sixth element in the first row are valued as zero; a first element, a second element and a third element in the second row are valued as zero; a first element in a third row and a fourth element in a fourth row are valued as a first directional coordinate of the second pixel; a second element in the third row and a fifth element in the fourth row are valued as a second directional coordinate of the second pixel; a third element in the third row and a sixth element in the fourth row are valued as one; a fourth element, a fifth element and a sixth element in the third row are valued as zero; a first element, a second element and a third element in the fourth row are valued as zero; a first element in a fifth row and a fourth element in a sixth row are valued as a first directional coordinate of the third pixel; a second element in the fifth row and a fifth element in the sixth row are valued as a second directional coordinate of the third pixel; a third element in the fifth row and a sixth element in the sixth row are valued as one; a fourth element, a fifth element and a sixth element in the fifth row are valued as zero; a first element, a second element and a third element in the sixth row are valued as zero.

8. An electronic device, comprising:
one or more processors;
a storage device, stored with one or more programs therein; and when the one or more programs are executed by the one or more processors, enabling the one or more processors to perform:

obtaining a first image and a second image collection; wherein the second image collection comprises at least two second images;

obtaining coordinates of three non-collinear pixels in the first image to form a coordinate collection;

generating a target matrix according to the coordinate collection; and for the at least two second images in the second image collection, obtaining coordinates of pixels in the at least two second images corresponding to coordinate-indicative pixels in the coordinate collection to form a corresponding coordinate collection; according to the corresponding coordinate collection, generating a target column vector matching a column number of the target matrix; pre-multiplying the target matrix by the target column vector to obtain a transformation column vector; determining the geometric transformation relation of the first images and the at least two second images according to the transformation column vector; wherein elements in the transformation column vector act as geometric transformation parameters of the geometric transformation relation between the first images and the at least two second images.

9. The electronic device according to claim 8, wherein the storage device further stores the one or more programs that upon execution by the one or more processors cause the electronic device to:

obtain coordinates of three non-collinear feature points of the first image.

10. The electronic device according to claim 9, wherein the storage device further stores the one or more programs that upon execution by the one or more processors cause the electronic device to:

obtain the coordinates of the feature points of the first image to form a first coordinate collection; and for the at least two second images in the second image collection, obtain coordinates of feature points of the at least two second images matching feature points indicated by a first coordinate in the first coordinate collection to form a second coordinate collection according to the geometric transformation relation of the first image and the at least two second images and the first coordinate collection, determine a second coordinate in the second coordinate collection as a target second coordinate; wherein a feature point indicated by the target second coordinate is a mismatched feature point.

11. The electronic device according to claim 8, wherein the storage device further stores the one or more programs that upon execution by the one or more processors cause the electronic device to:

according to the coordinate collection, generate a first matrix, and determine an inverse matrix of the first matrix as the target matrix.

12. The electronic device according to claim 8, wherein corresponding coordinates in the corresponding coordinate collection respectively indicate a first corresponding pixel, a second corresponding pixel and a third corresponding pixel; and wherein elements in the target column vector are valued as follows: an element in a first row is valued as a first directional coordinate of the first corresponding pixel; an element in a second row is valued as a second directional coordinate of the first corresponding pixel; an element in a third row is valued as a first directional coordinate of the second corresponding pixel; an element in a fourth row is valued as a second directional coordinate of the second corresponding pixel; an element in a fifth row is valued as a first directional coordinate of the third corresponding pixel; an element in a sixth row is valued, as a second directional coordinate of the third corresponding pixel.

13. The electronic device according to claim 8, wherein the storage device further stores the one or more programs that upon execution by the one or more processors cause the electronic device to:

generate a transformation matrix with three rows and three columns configured for indicating the geometric transformation relation between the first image and the at least two second images according to the transformation column vector; wherein elements in the transformation column vector are valued as below: a value of a first element in a first row is a value of an element in a first row of the transformation column vector; a value of a second element in a first row is a value of an element in a second row of the transformation column vector; a value of a third element in a first row is a value of an element in a third row of the transformation column vector: a value of a first element in a second row is a value of an element in a fourth row of the transformation column vector; a value of a second element in a second row is a value of an element in a fifth row of the transformation column vector; a value of a third element in a second row is a value of an element in a sixth row of the transformation column vector; values of a first element and a second element in a third row are zero; a value of a third element in the third row is one.

14. The electronic device according to claim 11, wherein coordinates in the coordinate collection respectively indicate a first pixel, a second pixel and a third pixel; and wherein elements in the first matrix are valued as below: a first element in a first row and a fourth element in a second row are valued as a first directional coordinate of the first pixel; a second element in the first row and a fifth element in the second row are valued as a second directional coordinate of the first pixel; a third element in the first row and a sixth element in the second row are valued as one; a fourth element, a fifth element and a sixth element in the first row are valued as zero; a first element, a second element and a third element in the second row are valued as zero; a first element in a third row and a fourth element in a fourth row are valued as a first directional coordinate of the second pixel; a second element in the third row and a fifth element in the fourth row are valued as a second directional coordinate of the second pixel; a third element in the third row and a sixth element in the fourth row are valued as one; a fourth element, a fifth element and a sixth element in the third row are valued as zero; a first element, a second element and a third element in the fourth row are valued as zero; a first element in a fifth row and a fourth element in a sixth row are valued as a first directional coordinate of the third pixel; a second element in the fifth row and a fifth element in the sixth row are valued as a second directional coordinate of the third pixel; a third element in the fifth row and a sixth element in the sixth row are valued as one; a fourth element, a fifth element and a sixth element in the fifth row are valued as zero; a first element, a second element and a third element in the sixth row are valued as zero.

15. A non-transitory computer readable medium, stored with a computer program therein, wherein the computer program is executed by a processor to perform:
obtaining a first image and a second image collection; wherein the second image collection comprises at least two second images;
obtaining coordinates of three non-collinear pixels in the first image to form a coordinate collection;
generating a target matrix according to the coordinate collection; and
for the at least two second images in the second image collection, obtaining coordinates of pixels in the at least two second images corresponding to coordinate-indicative pixels in the coordinate collection to form a corresponding coordinate collection; according to the corresponding coordinate collection, generating a target column vector matching a column number of the target matrix; pre-multiplying the target matrix by the target column vector to obtain a transformation column vector; determining the geometric transformation relation of the first images and the at least two second images according to the transformation column vector; wherein elements in the transformation column vector act as geometric transformation parameters of the geometric transformation relation between the first images and the at least two second images.

16. The non-transitory computer readable medium according to claim 15, wherein the computer readable medium further stores the computer program that upon execution by the processor cause the computer readable medium to:
obtain coordinates of three non-collinear feature points of the first image.

17. The non-transitory computer readable medium according to claim 16, wherein the computer readable medium further stores the computer program that upon execution by the processor cause the computer readable medium to:
obtain the coordinates of the feature points of the first image to form a first coordinate collection; and
for the at least two second images in the second image collection, obtain coordinates of feature points of the at least two second images matching feature points indicated by a first coordinate in the first coordinate collection to form a second coordinate collection; according to the geometric transformation relation of the first image and the at least two second images and the first coordinate collection, determine a second coordinate in the second coordinate collection as a target second coordinate; wherein a feature point indicated by the target second coordinate is a mismatched feature point.

18. The non-transitory computer readable medium according to claim 15, wherein the computer readable medium further stores the computer program that upon execution by the processor cause the computer readable medium to:
according to the coordinate collection, generate a first matrix, and determine an inverse matrix of the first matrix as the target matrix.

19. The non-transitory computer readable medium according to claim 15, wherein corresponding coordinates in the corresponding coordinate collection respectively indicate a first corresponding pixel, a second corresponding pixel and a third corresponding pixel; and
wherein elements in the target column vector are valued as follows: an element in a first row is valued as a first directional coordinate of the first corresponding pixel; an element in a second row is valued as a second directional coordinate of the first corresponding pixel; an element in a third row is valued as a first directional coordinate of the second corresponding pixel; an element in a fourth row is valued as a second directional coordinate of the second corresponding pixel; an element in a fifth row is valued as a first directional coordinate of the third corresponding pixel; an element in a sixth row is valued as a second directional coordinate of the third corresponding pixel.

20. The non-transitory computer readable medium according to claim 15, wherein the computer readable medium further stores the computer program that upon execution by the processor cause the computer readable medium to:
generate a transformation matrix with three rows and three columns configured for indicating the geometric transformation relation between the first image and the at least two second images according to the transformation column vector; wherein elements in the transformation column vector are valued as below: a value of a first element in a first row is a value of an element in a first row of the transformation column vector; a value of a second element in a first row is a value of an element in a second row of the transformation column vector; a value of a third element in a first row is a value of an element in a third row of the transformation column vector: a value of a first element in a second row is a value of an element in a fourth row of the transformation column vector; a value of a second element in a second row is a value of an element in a fifth row of the transformation column vector; a value of a third element in a second row is a value of an element in a sixth row of the transformation column vector; values of a first element and a second element in a third row are zero; a value of a third element in the third row is one.

* * * * *